(No Model.)
O. LUGO.
ELECTRIC BATTERY.
No. 362,847. Patented May 10, 1887.
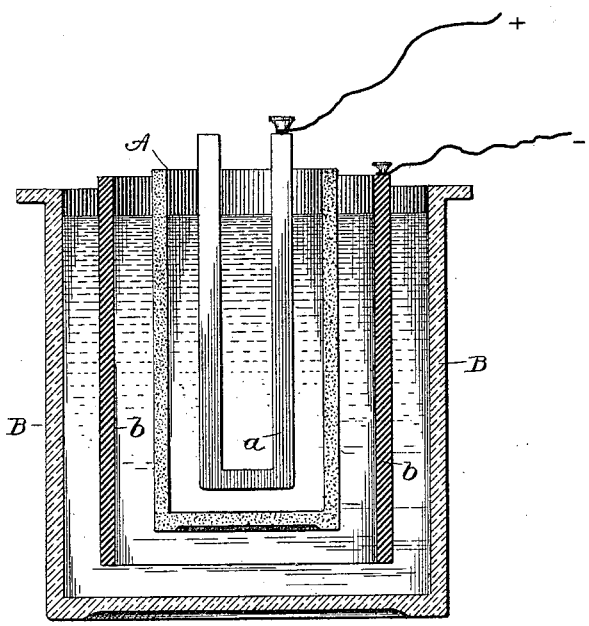
Witnesses:
W. W. Mortimer
H. F. Riley
Inventor:
Orazio Lugo,
by R. S. Dyrenforth.
his Attorney.

UNITED STATES PATENT OFFICE.

ORAZIO LUGO, OF NEW YORK, ASSIGNOR TO COLIN M. THOMPSON, OF BROOKLYN, N. Y.

ELECTRIC BATTERY.

SPECIFICATION forming part of Letters Patent No. 362,847, dated May 10, 1887.

Application filed January 6, 1887. Serial No. 223,603. (No model.)

*To all whom it may concern:*

Be it known that I, ORAZIO LUGO, a citizen of the United States, residing at New York, in the county of New York and State of New York, have invented certain new and useful Improvements in Electric Batteries; and I do hereby declare the following to be a full, clear, and exact description of the invention, such as will enable others skilled in the art to which it appertains to make and use the same.

In a previous patent I have described and claimed an electric battery in which the negative element is kept free from deposit of other elemental matter, thus conducing toward a constant electrical energy or volt-ampère; but in electric batteries constructed with their elements in contact with two solutions, one alkaline and the other acid, owing to the great chemical affinity of alkali and acid for each other, the solutions soon become neutralized. Notwithstanding their separation by an inert porous medium, the neutralizing process continues even when the battery is in closed circuit; hence, generally, electric batteries of this kind are not sufficient in electro-motive force, and are expensive.

The objects of the present invention are, while keeping the negative element free from deposit, conducing in this way toward constant electrical energy or volt-ampère, to obtain a greater electro-motive force than heretofore, and at once conserve the battery by preventing interdiffusion of the acid and alkaline solutions, the ampère-current also to be regulated, as may be desired.

I have discovered, when the elements of an electric battery are respectively in contact with alkaline and acid solutions, that the interdiffusion of the liquids may be almost totally prevented by the addition to the acid of a metallic salt, this interdiffusion being thus prevented whether the battery be in closed or open circuit, and the osmotic action of gas produced when the circuit is closed not being arrested thereby, but taking place freely. Even when the porous medium is filled with a neutral salt, formed by the action of the acid upon the alkali, osmotic action of the gases will still continue.

In the accompanying drawing I have illustrated means for carrying my invention into effect, the figure represented being a vertical section of an electrical cell.

As an illustration of one means of carrying my invention into effect I construct a cell of two elements, one being zinc, while the other may be carbon, and these elements are in contact with two liquids, the one being alkaline and the other an acid containing a metallic salt. In a porous cup, A, is the carbon $a$, and into this cup is put, say, nitric acid and a solution of nitrate of copper. In an outer jar, B, generally of glass, is the zinc element $b$, and into this jar is put a solution of a caustic alkali—such as caustic soda. The order of placing the elements and liquids in the battery may be reversed—that is to say, the acid-metallic solution and the carbon may be in the outer compartment or glass jar and the caustic soda and zinc be in the inner compartment or porous cup. The two elements constituting the battery are thus in contact with three different liquids or solutions.

I have constructed a battery of amalgamated zinc in a caustic-soda solution, of 40° Baumé, in the glass jar, the porous cup containing of nitric acid, of 35° Baumé, two-thirds, and of nitrate-of-copper solution, of 35° Baumé, one-third, the carbon element being immersed in the acid-copper solution with the following results: electro-motive force, 2.5 volts at the start. After having kept the cell short-circuited for two hundred and sixty-four hours it still gave 2.4 volts.

As well as by varying the size of the two elements, the ampère-current of this battery can be obtained of the desired quantity by changing the proportions of the nitric acid and the nitrate of copper, the less the quantity of nitrate of copper present the greater being the ampère-current and the lower the internal resistance of the battery for given-size electrodes. It is well, also, to vary the strength of the alkaline solution in inverse proportion to the density of the acid-salt solution.

Other acids and metallic salts may be used instead of nitric acid and nitrate of copper—such as hydrochloric acid and chloride of copper or sulphuric acid and sulphate of copper, or any of the other nitrates, sulphates, chlorides, or chlorates, preferably in solution with the acid belonging to the metallic salt used.

It is understood that the electro-motive force will vary according to the salt and acid employed in making up the cell, and also the constancy of the current will depend upon whether the free acid used can dissolve the metal deposited on the carbon element and maintain a free carbon contact while the battery is at work, if a free carbon contact and the highest electro-motive force is desired.

Sulphate of copper and sulphuric acid will not prevent the deposition of copper on the carbon element without nitric acid being present.

Having thus fully described my invention, what I claim as new, and desire to secure by Letters Patent, is—

1. An electric battery in which one element is immersed in an acid and the other in an alkaline solution, one solution containing a substance which will retard or nearly prevent interdiffusion of the liquids, substantially as described.

2. An electric battery in which the positive element is in contact with an alkaline solution and the negative element with an acid solution, there being an interposed porous medium between the solutions, and the acid solution containing a metallic salt, whereby, while the acid acts to keep the negative element free from deposit of objectionable elemental matter, thus obtaining a constant electrical energy or volt-ampère, the salt will prevent or retard the interdiffusion of the solutions without preventing, when the circuit of the battery is closed, osmotic action through the porous medium of the gas, substantially as described.

3. The method of decreasing or increasing the ampère-current by changing the relative proportions in the acid and metallic-salt solution around the negative electrode, substantially as described.

In testimony whereof I affix my signature in presence of two witnesses.

ORAZIO LUGO.

Witnesses:
C. M. THOMPSON,
GROSVENOR S. HUBBARD.